Patented Sept. 3, 1946

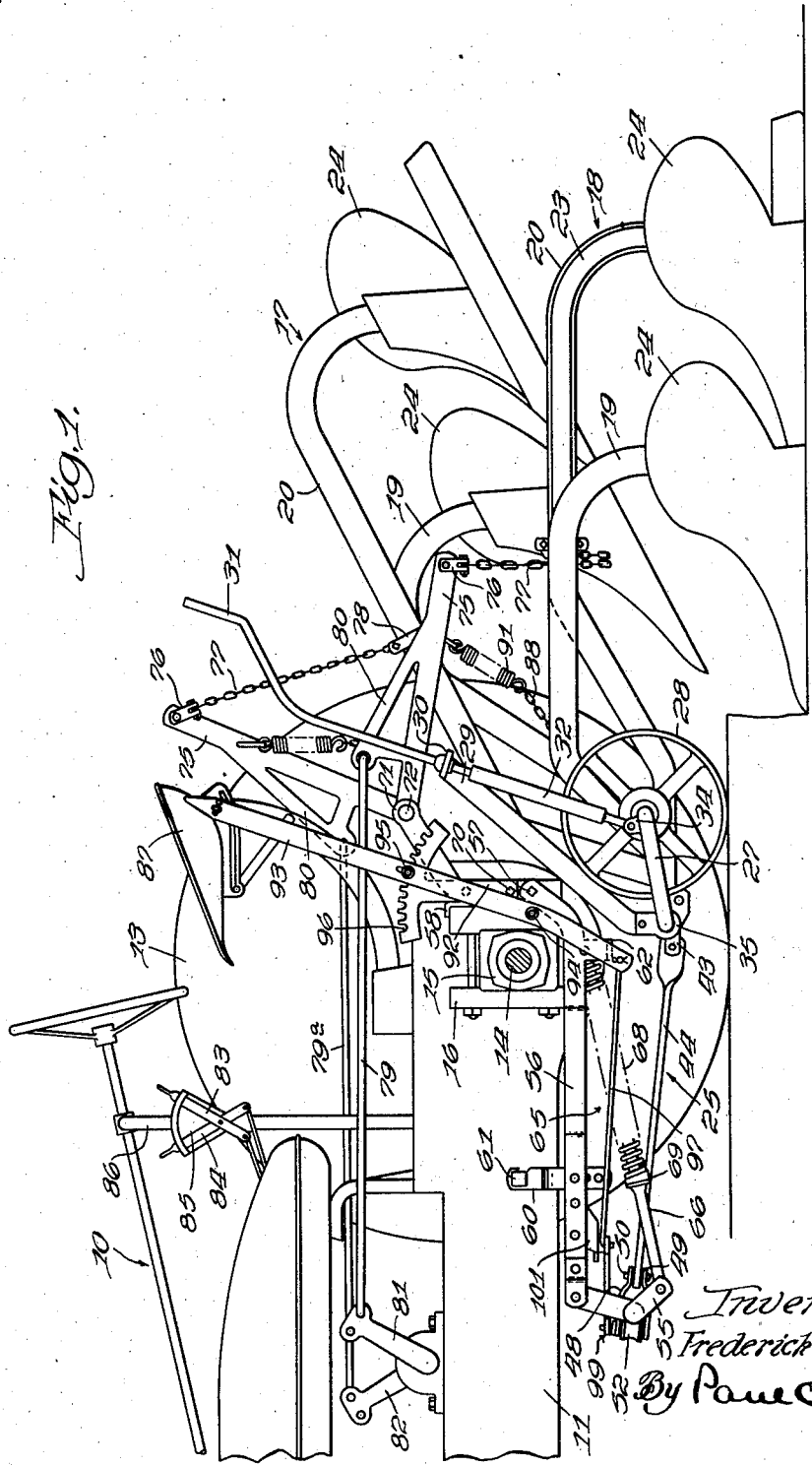

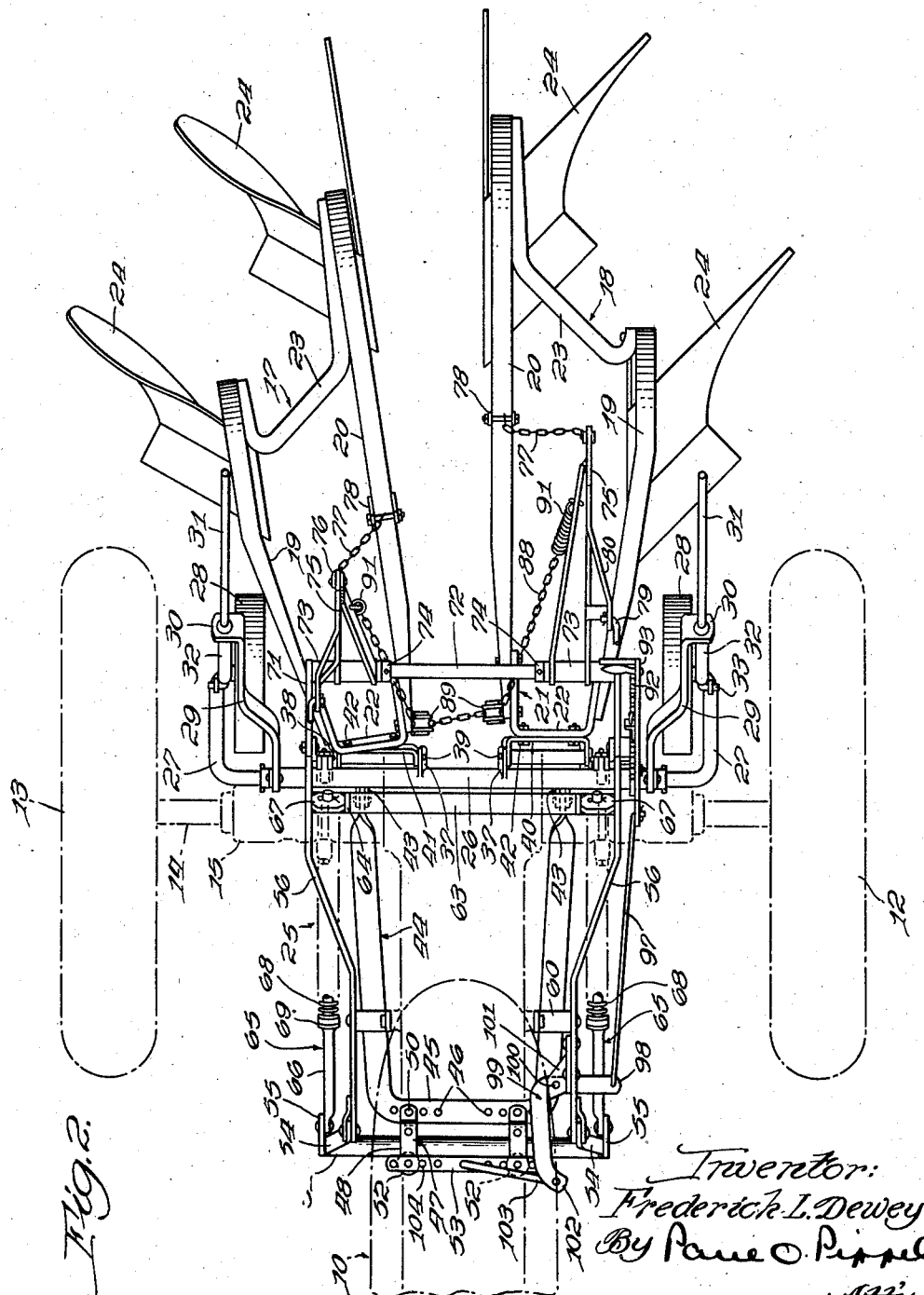

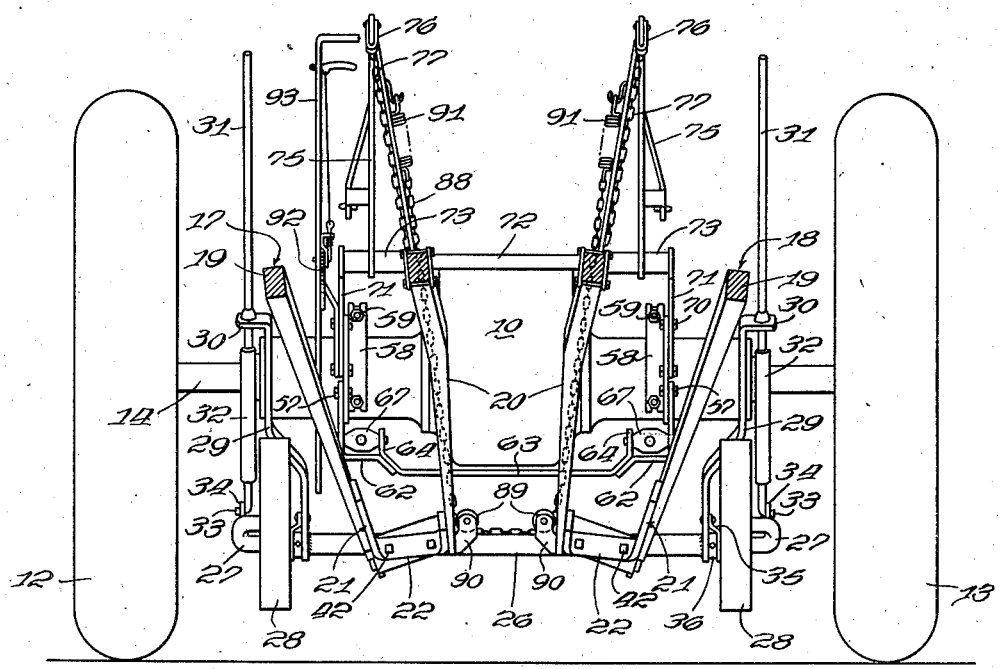

2,407,064

UNITED STATES PATENT OFFICE 2,407,064

AGRICULTURAL IMPLEMENT

Frederick L. Dewey, Canton, Ill., assignor to International Harvester Company, a corporation of New Jersey Application May 22, 1944, Serial No. 536,705

19 Claims. (Cl. 97—29)

This invention relates to agricultural implements and particularly to implements adapted to be mounted upon a tractor to be supported thereby.

An object of the invention is the provision of an improved plow.

Another object of the invention is the provision of an improved two-way plow.

Another object is the provision of a tractor-mounted two-way plow which is adapted to be supported entirely by the tractor but which is stabilized from the ground.

A further object is to provide a novel tractor-mounted two-way plow which has free floating movement when in operating position, and which is stabilized by gauge wheels which are lifted above the ground when both of the plow units are in transport position, but which remain on the ground when either of the plow units is in operating position.

Other objects and advantages of the invention will appear from the following detailed description when read in conjunction with the accompanying drawings, wherein:

Figure 1 is a view in side elevation of the rear end of a tractor, showing the plow of the present invention mounted thereupon;

Figure 2 is a plan view of the structure shown in Figure 1; and

Figure 3 is a rear elevation of the plow of the present invention with certain parts removed for clarity, and showing both plow units in transport position.

In the drawings, it will be noted that the plow of the present invention is attached to a tractor generally indicated at 10 and having a longitudinally extending body portion 11. The rear end of the tractor is supported by laterally spaced drive wheels 12 and 13 mounted upon a transverse axle 14 journaled in a rear axle housing 15, which is provided at laterally spaced points with implement attaching structures 16.

The plow of the present invention includes a pair of laterally spaced, longitudinally extending plow units 17 and 18, each being of substantially the same structure and comprising a pair of beams 19 and 20 separated and braced at their forward ends by a spreader member 21, which is a U-shaped member having a transverse portion 22. Portions 19 and 20 are likewise connected and braced rearwardly by a member 23. The rear ends of beams 19 and 20 curve downwardly and are provided at their lower ends with plow bottoms 24, the plow bottoms on the right-hand unit 17 being right-hand plow bottoms and those on unit 18 being left-hand plow bottoms, the two plow units 17 and 18 thus being designed for alternate operation. This arrangement permits the plow to traverse a field in opposite directions and to open adjacent furrows.

The forward ends of plow units 17 and 18 are connected to a hitch structure generally indicated at 25. This structure includes a transversely extending sleeve member 26, the opposite ends of which are hollow and receive therein the transversely extending portion of crank axles 27, each said crank axle having an inturned stub portion upon which is mounted a gauge wheel 28. Each end of the sleeve member 26 is provided with a standard 29 weldingly secured thereto and bent at its upper end to provide an apertured ear 30 to receive therein for axial rotation the shaft portion of a crank 31. Crank 31 is threaded at its lower end for insertion in a correspondingly threaded sleeve 32, the lower end of which is provided with a hook 33 for engagement with a lug 34 on the crank axle 27 at a point near the axis of the gauge wheel 28. Provision is made against lateral sliding movement of the wheel 28 by a clip 35 fastened to standard 29 and spaced therefrom by a collar 36, keyed to the transverse portion of crank arm 27. Thus, by turning the crank 31, it should be clear that the gauge wheel 28 may be swung vertically about the sleeve member 26 as an axis to vary the vertical position of the wheel for changing depth of plowing or for leveling the plow.

Connection of the plow units 17 and 18 to the sleeve member 26 is made by means of a structure comprising laterally spaced pairs of radially projecting, circumferentially displaced lugs 37 and 38. These lugs are apertured to receive a pin 39 upon which is pivotally mounted a U-shaped member 40 having a transverse portion 41, which, due to the circumferential displacement of lugs 37 and 38, occupies a position at a slight angle to the horizontal. Members 40 are attached to the members 21, at the forward end of plow units 17 and 18, by bolts 42, the plow units thus having vertical pivotal movement about the pins 39. The inclination of the pivot axis of members 40 is such as to cause plow units 17 and 18 to be diverted outwardly when raised. It may also be noted that the angular relationship of member 21 with respect to member 40 may be varied by suitable mechanism, not shown, to level the plow units.

Likewise projecting from sleeve member 26 are forwardly projecting lugs 43 to which are pivotally attached the laterally spaced arms of a forwardly extending U-shaped hitch arch 44 having a transverse portion 45. Openings 46 in transverse portion 45 provide for the attachment at laterally selected points of spaced clevises 47 for lateral pivotal movement. Clevises 47 comprise vertically spaced elements 48 and 49, the rear ends of which are pivoted upon pins 50 each inserted in one of the openings 46. The elements 48 and 49 straddle a transverse draft bar 51, and their forward ends are spaced by a roller 52 having a grooved surface adapted to fit the contour of the draft bar 51. Likewise connected to the upper portion of the clevises 47 is a transverse strap 53 having a number of apertures therein for a purpose hereinafter set forth.

Draft bar 51 is provided at its ends with upwardly extending arms 54 and downwardly extending arms 55. To the upper end of each arm 54 is pivotally connected a rearwardly extending hitch strap 56, the rear end of which is attached by a bolt 57 to an angle member 58 having open-ended slots in the upper and lower edges thereof for the reception of bolts 59, pivotally mounted upon the tractor attaching structure 16, as clearly viewed in Figures 1 and 3. Hitch structure 56 is protected against vertical stress by an upstanding strap 60 secured to the hitch strap 56, and having at its upper end an open-ended slot for the reception of a bolt 61, projecting from the side of the tractor, the hitch straps 56 on both sides of the tractor being similarly attached.

Near its rear end each strap 56 is provided with a downwardly and inwardly bent extension 62, the extensions 62 on opposite sides of the center line of the tractor being connected by a supporting member 63 having laterally spaced, upwardly extending ears 64 for a purpose hereinafter set forth. Flexibility is imparted to the plow hitch by means of a spring member 65 comprising a guide rod 66, the forward end of which is connected to the depending end of arm 55 and the rear end of which is inserted for sliding movement in a swivel member 67 extending between the extension 62 of strap 56 and ear 64 of supporting member 63. Guide rod 66 is surrounded by a spring 68 abutting against the swivel 67 at one end and a collar 69 at the other.

It should now be understood that the hitch structure 25, including the straps 56 and the angle members 58, is part of the plow structure, and that the plow is readily attached to the tractor simply by fitting the slots in the angle members 58 and straps 60 over the bolts 59 and 61, respectively. Thus the plow is likewise readily removed from the tractor as a unit.

Also attached to the angle member 58 by bolts 70 are laterally spaced standards 71, having at their upper ends rearwardly bent portions having openings at their ends adapted to receive the ends of a transverse rock-shaft 72. This rock-shaft 72 is journaled in the brackets 71 and is provided adjacent its ends with laterally spaced sleeves 73. These sleeves are held against lateral displacement on the shaft 72 by collars 74. Secured to sleeves 73 are lifting arms 75, which extend upwardly and rearwardly and are provided at their upper ends with pivot members 76 having attached thereto chains 77, the lower ends of which are attached to brackets 78 on the respective beams 20 of the plow units 17 and 18. Arms 75 thus have rocking movement about the shaft 72 to raise and lower the plow units. Rocking of the arms 75 for vertically moving the plow units is effected by means of connecting rods 79 and 79a, the rear ends of these rods being pivotally connected to extensions 80 on arms 75 and the forward ends of these rods being connected respectively to power lift arms 81 and 82. Power lift arms 81 and 82 are independently mounted on the tractor for rocking movement, and power for effecting rocking movement thereof is supplied by a power-lift mechanism not shown, of suitable form, deriving power from the tractor. Movement of these arms independently is initiated by levers 83 and 84 mounted on a quadrant 85 on the steering post 86 of the tractor, the levers being accessible to a tractor operator from his seat 87.

In Figures 1 and 2, the plow of the present invention is shown with the right-hand plow unit 17 raised to transport position, while plow unit 18 is in plowing position. Figure 3 shows the plow with both units raised to transport position. It will be noted that in Figure 3, the gauge wheels 28 are shown lifted from the ground with the working tools, while in Figures 1 and 2, wherein one of the plow units is operating, both of the wheels 28 are in contact with the ground. This is made possible through a mechanism comprising chain 88 having one end attached to one of the arms 75 on the left side of the tractor and the other end attached to the arm 75 on the right side of the tractor. Chain 88 is thus continuous between the arms 75 and extends downwardly and is passed around laterally spaced idler rollers 89, each of which is mounted for rotation in a pulley block 90 attached to the inner surface of the beam 20 adjacent its forward end. The upper ends of the chain 88 are flexibly connected to the arms 75 by the interposition of springs 91. Thus in Figure 3, with both of the plow units in raised position, the arms 75 extend almost vertically upwardly, the chain 88 is taut, and the front ends of the plow units, and therefore transverse member 26 carrying the gauge wheels 28, are likewise lifted off the ground. On the other hand, when one of the plow units is in operating position, as is always the case when the plow is operating, the position of one of the arms 75 is considerably lower, as may be seen in Figure 1, and no lifting effect is applied to the forward ends of the plow beams, slack being introduced into the chain 88. Therefore, both of the wheels 28 serve to gauge each plow unit as it is placed in operation, and when both of the plow units are raised above the ground for transport purposes the gauge wheels 28 are likewise lifted. Free vertical floating movement of the operating unit, it may be noted, is imparted thereto by the introduction of slack in the chains 77 by which the plow units are connected to the lifting arms 75. Adjustment of the gauge wheels 26 to vary the operating depth of the tools, as pointed out before, is accomplished by means of crank 31.

In operating a two-way plow, it is well known that under many conditions it is necessary to shift the hitch point of the plow on the tractor. The connection of the hitch arch 44 to the draft bar 51 for lateral movement has already been described. The mechanism by which this lateral shifting is accomplished includes a quadrant 92 having a lever 93 adapted to move thereover, and pivoted at 94 upon an extension of the angle member 58. The usual detent mechanism 95 is provided for engagement in notches 96 in the quadrant. The lower end of the lever 93, projecting beyond the pivot 94, is connected by a forwardly extending rod 97 to one arm 98 of a bell-crank 99 pivoted at 100 upon a bearing member 101 secured to the left-hand strap 56. Another arm 102 of bell-crank 99 is provided at its end with an opening for the connection of a link 103, which extends laterally and is bent at one end for insertion in one or more openings 104 in the member 53. Thus movement of lever 93 over the quadrant 92, acting through bell-crank 99, laterally moves the hitch arch 44 to bring the operating plow unit into proper plowing position with respect to the tractor. It will also be noted that this lever and quadrant arrangement is a part of the plow structure and is detachable therewith from the tractor. Detachment of the entire implement from the tractor requires merely the disengagement of the connecting rods 79 and 79a, and the angle members 58 and straps 60.

Having now described the invention, it should be understood that modifications may be made therein without departing from the spirit of the invention or the scope of the appended claims.

What is claimed is:

1. In a tractor-mounted two-way plow having working units adapted for alternate operation, lifting means for vertically moving the working units independently between operating and transport positions, a ground-contacting gauge wheel associated with each said unit, means for vertically adjusting each said gauge wheel with respect to its associated working unit to vary the depth of operation thereof, and connecting means between said lifting means and said gauge wheels effective to remove both said gauge wheels from contact with the ground when both said units are raised to transport position, but ineffective to remove said gauge wheels from the ground when either of said units is in operating position.

2. In a tractor-mounted two-way plow having working units adapted for alternate operation, lifting means for vertically moving the working units independently between operating and transport positions, means permitting free floating movement of the operating working unit, a ground-contacting gauge wheel associated with each said unit, means for vertically adjusting each said gauge wheel with respect to its associated working unit to vary the depth of operation thereof, and connecting means between said lifting means and said gauge wheels effective to remove both said gauge wheels from contact with the ground when both said units are raised to transport position, but ineffective to remove said gauge wheels from the ground when either of said units is in operating position.

3. The combination with a tractor of a direct-connected two-way plow comprising laterally spaced longitudinally extending earth-working units adapted for alternate operation, lifting means deriving power from the tractor for vertically moving said working units independently between operating and transport positions, including means permitting free floating movement of the operating working unit, ground-contacting wheels for supporting the operating working unit in its working position, and connecting means between said lifting means and said working units effective to raise said supporting wheels out of contact with the ground when both said units are lifted to transport position, but ineffective to raise said supporting wheels when either of said units is in operating position.

4. The combination with a tractor of a direct-connected two-way plow comprising laterally spaced longitudinally extending earth-working units adapted for alternate operation, lifting means deriving power from the tractor for vertically moving said working units independently between operating and transport positions, including means permitting free floating movement of the operating working unit, ground-contacting wheels for supporting the operating working unit in its working position, and rope and pulley means connecting the lifting means for each said unit with said supporting wheels and ineffective to raise said supporting wheels during alternate operation of said units, but effective to raise said supporting wheels when both said units are lifted to transport position.

5. The combination with a tractor of a direct-connected two-way plow comprising laterally spaced longitudinally extending earth-working units adapted for alternate operation, longitudinally extending hitch means connected at its forward end to the tractor for vertical pivotal movement, means pivotally connecting the forward ends of said working units to the rear end of said hitch means for relative vertical movement, lifting means deriving power from the tractor for vertically moving said working units independently between operating and transport positions including means permitting free floating movement of the operating working unit, laterally spaced ground-contacting gauge wheels supporting the rear end of said hitch means, means for vertically adjusting said gauge wheels with respect to said working units, and means operatively connecting said lifting means and said gauge wheels for raising said wheels out of contact with the ground when both of said units are lifted to transport position, said connecting means being inoperative to raise said wheels when either of said units is in operating position.

6. The combination with a tractor of a direct-connected two-way plow comprising laterally spaced longitudinally extending earth-working units adapted for alternate operation, longitudinally extending hitch means connected at its forward end to the tractor for vertical pivotal movement, means pivotally connecting the forward ends of said working units to the rear end of said hitch means for relative vertical movement, lifting means deriving power from the tractor for vertically moving said working units independently between operating and transport positions including means permitting free floating movement of the operating working unit, and connecting means between said lifting means and the rear end of said hitch means for vertically pivoting said hitch means simultaneously with the lifting of both of said working units, said connecting means being ineffective to pivot said hitch means when either of said units is in operating position.

7. The combination with a tractor of a direct-connected two-way plow comprising longitudinally extending hitch means connected at its forward end to the tractor for vertical pivotal movement and having a transverse member at the rear end thereof, a gauge wheel supported at each end of said member, means for independently vertically adjusting said wheels, laterally spaced longitudinally extending earth-working units adapted for alternate operation, and means pivotally connecting the forward ends of both said units to said transverse member for vertical movement.

8. The combination with a tractor of a direct-connected two-way plow comprising longitudinally extending hitch means connected at its forward end to the tractor for vertical pivotal movement and having a transverse member at the rear end thereof, a gauge wheel supported at each end of said member, means for independently vertically adjusting said wheels, laterally spaced longitudinally extending earth-working units adapted for alternate operation, means pivotally connecting the forward ends of both said units to said transverse member for vertical movement, and lifting means deriving power from the tractor for vertically moving said working units independently between operating and transport positions, including means permitting free floating movement of the operating working unit.

9. In combination with a tractor of a direct-connected two-way plow comprising longitudinally extending hitch means connected at its forward end to the tractor for vertical pivotal movement and having a transverse member at the rear end thereof, a gauge wheel supported at each end of said member, means for independently vertically adjusting said wheels, laterally spaced longitudinally extending earth-working units adapted for alternate operation, means pivotally connecting the forward ends of said units to said transverse member for vertical movement, lifting means deriving power from the tractor for vertically moving said working units independently between operating and transport positions, including means permitting free floating movement of the operating working unit, and connecting means between said lifting means and said transverse member effective to raise said gauge wheels out of contact with the ground when both said units are lifted to transport position, but ineffective to raise said wheels when either of said units is in operating position, whereby both of said wheels serve as gauge means for the working unit in operating position.

10. A unitary plow and hitch assembly for direct connection to a tractor to be supported thereby, comprising a hitch structure, a longitudinally extending tool-carrying frame pivoted at its forward end to said hitch structure for vertical movement, a gauge wheel on said hitch structure adjacent the connection of said frame thereto, means on said hitch structure for vertically adjusting said gauge wheel, a shaft on said hitch structure, a rock arm on said shaft, lifting connections between said rock arm and said tool-supporting frame, and bolt and slot means for quick-attachably connecting said hitch structure to a tractor.

11. A unitary plow and hitch assembly for direct connection to a tractor to be supported thereby, comprising a hinged hitch structure including a stationary portion having means for the attachment thereof to a tractor and a vertically swinging portion, a longitudinally extending tool-carrying frame pivotally attached at its forward end to the free end of said vertically swinging portion for vertical movement with respect thereto, means mounted on said stationary portion for laterally adjusting said swinging portion with respect to said stationary portion, a shaft on said stationary portion, a rock arm on said shaft, and lifting connections between said rock arm and said tool-supporting frame.

12. A unitary plow and hitch assembly for direct connection to a tractor to be supported thereby, comprising a hinged hitch structure including a stationary portion having means for the attachment thereof to a tractor and a vertically swinging portion, a longitudinally extending tool-carrying frame pivotally attached at its forward end to the free end of said vertically swinging portion for vertical movement with respect thereto, means mounted on said stationary portion for laterally adjusting said swinging portion with respect to said stationary portion, a shaft on said stationary portion, a rock arm on said shaft, lifting connections between said rock arm and said tool-supporting frame, ground-contacting gauge means on said hitch structure adjacent the connection of said frame thereto, and means on the swinging portion of said hitch structure for vertically adjusting said gauge wheel relative to said tool-supporting frame.

13. In an agricultural implement adapted for connection to a tractor, in combination, a longitudinally extending hitch structure pivoted at its forward end to the tractor for vertical movement, a tool-supporting structure pivoted to the rear portion of said hitch structure for vertical movement relative thereto, ground contacting means supporting the forward end of said tool-supporting structure, lift mechanism on the tractor, means connecting the lift mechanism to the tool-supporting structure for vertical movement thereof, and separate means operatively connecting said lift mechanism to said ground contacting means for effecting movement thereof with said tool-supporting structure when the latter is raised to transport position.

14. In an agricultural implement adapted for connection to a tractor, in combination, a longitudinally extending hitch structure pivoted at its forward end to the tractor for vertical movement, a tool frame pivoted to the rear end of said hitch structure on a transverse axis for vertical movement relative thereto, crank axles pivoted on the pivot axis of said tool frame to said hitch structure, laterally spaced gauge wheels on said crank axles, means on said tool frame for adjusting the vertical position of said gauge wheels, lift mechanism on the tractor, means connecting the lift mechanism to the tool frame for pivotal movement thereof about said pivot axis, and means operatively connecting said lift mechanism to said gauge wheels for effecting movement thereof with said tool frame when the latter is raised to transport position.

15. In an agricultural implement adapted for connection to a tractor or the like, a longitudinally extending hitch structure pivoted at its forward end to the tractor for vertical movement, a tool-supporting structure pivoted to the rear end of said hitch structure for vertical movement relative thereto, said tool supporting structure including independently operable units, one of which is placed in operating position while the other is inoperative, ground-contacting wheel means supporting the forward end of said tool-supporting structure, independently operable lift mechanisms on the tractor connected to said units for effecting independent vertical movement thereof to transport position, and separate means connecting said lift mechanisms to the forward end of said tool supporting structure adjacent its pivot axis and operative to raise the front end of said tool-supporting structure when both said units are lifted to transport position, but inoperative to raise the front end of said tool-supporting structure when either of said units is in operating position.

16. In a two-way plow adapted for connection to a tractor, in combination, a pair of longitudinally extending independently operable plow units pivoted at their forward ends for vertical movement between operating and transport positions, draft means connecting the front ends of said units, laterally spaced gauge wheels supporting the front ends of said units, independently operable lift mechanisms on the tractor, means connecting said lift mechanisms to the respective plow units for independent pivotal movement thereof, means operatively connecting both of said lift mechanisms to said gauge wheels for vertical movement thereof with the plow units when the latter are both raised to transport position, said last mentioned connecting means being so arranged as to be ineffective to raise the gauge wheels when only one of said units is raised to transport position.

17. In a two-way plow adapted for connection to a tractor, in combination, a pair of longitudinally extending, independently operable plow units pivoted at their forward ends for vertical movement between operating and transport positions, draft means connecting the front ends of said units, laterally spaced gauge wheels supporting the front ends of said units, independently operable lift mechanisms on the tractor, means connecting said lift mechanisms to the respective plow units for independent pivotal movement thereof, means operatively connecting both of said lift mechanisms to said gauge wheels for vertical movement thereof with the plow units when the latter are both raised to transport position, said last mentioned connecting means being such that both of said gauge wheels remain upon the ground in gauging relation to the operating plow unit, and are raised only when both plow units are lifted to transport position.

18. In a two-way plow adapted for connection to a tractor, a pair of longitudinally extending independently operable plow units pivoted at their forward ends for vertical movement between operating and transport positions, draft means connecting the front ends of said units, laterally spaced gauge wheels supporting the front ends of said units, independently operable lift mechanisms on the tractor including laterally spaced arms pivoted on the tractor for vertical movement, means connecting said lift arms to the respective plow units for independent pivotal movement thereof, flexible means connecting said lift arms, means slidably connecting said flexible means with said draft means for lifting said gauge wheels when both said plow units are raised to transport position, said lifting mechanism being ineffective to lift said gauge wheels when either of said units is in operating position.

19. In a two-way plow adapted for connection to a tractor, a pair of longitudinally extending independently operable plow units pivoted at their forward ends for vertical movement between operating and transport positions, draft means connecting the front ends of said units, laterally spaced gauge wheels supporting the front ends of said units, independently operable lift mechanisms on the tractor including laterally spaced arms pivoted on the tractor for vertical movement, means connecting said lift arms to the respective plow units for independent pivotal movement thereof, a cable extending between said arms and depending therefrom, pulley means adjacent the front ends of said units arranged to slidingly receive the intermediate portion of said cable and suspend the front ends of said units with the associated gauge wheels above the ground when both said plow units are in transport position, sufficient slack being introduced in said cable when either of said units is in operating position to permit said gauge wheels to rest upon the ground.

FREDERICK L. DEWEY.